(12) United States Patent
Collison et al.

(10) Patent No.: US 10,450,123 B2
(45) Date of Patent: Oct. 22, 2019

(54) METHOD OF MAKING AN INSULATION MATERIAL AND AN INSULATED MAILER

(71) Applicant: MP Global Products, L.L.C., Norfolk, NE (US)

(72) Inventors: Alan B. Collison, Pierce, NE (US); Reid Borgman, Norfolk, NE (US)

(73) Assignee: MP Global Products, L.L.C., Norfolk, NE (US)

( * ) Notice: Subject to any disclaimer, the term of this patent is extended or adjusted under 35 U.S.C. 154(b) by 0 days.

(21) Appl. No.: 15/677,738

(22) Filed: Aug. 15, 2017

(65) Prior Publication Data

US 2018/0050857 A1    Feb. 22, 2018

Related U.S. Application Data

(60) Provisional application No. 62/375,555, filed on Aug. 16, 2016, provisional application No. 62/419,894,
(Continued)

(51) Int. Cl.
*B65D 81/38* (2006.01)
*B65D 27/00* (2006.01)
(Continued)

(52) U.S. Cl.
CPC ............ *B65D 81/3823* (2013.01); *B32B 7/14* (2013.01); *B32B 27/32* (2013.01); *B32B 29/005* (2013.01); *B32B 29/02* (2013.01); *B32B 29/08* (2013.01); *B65D 5/0227* (2013.01); *B65D 27/00* (2013.01); *B65D 27/005* (2013.01);
(Continued)

(58) Field of Classification Search
CPC .. B65D 81/3823; B65D 5/0227; B65D 27/00; B65D 27/005; B65D 81/3858; B65D 65/466; B32B 7/14; B32B 27/32; B32B 29/005; B32B 29/02; B32B 29/08; B32B 2307/7163; Y02W 90/13; D21H 27/005
USPC ......... 229/301; 428/206, 327, 503; 442/153, 442/412
See application file for complete search history.

(56) References Cited

U.S. PATENT DOCUMENTS

| 1,868,996 A | 7/1932 | Paul |
| 3,222,843 A | 12/1965 | Schneider |

(Continued)

FOREIGN PATENT DOCUMENTS

| JP | 2005139582 A | 6/2005 |
| WO | WO-97-26192 A1 | 7/1997 |

(Continued)

OTHER PUBLICATIONS

International Search Report and Written Opinion of the International Searching Authority for PCT/US2017/060403, dated Feb. 19, 2018.

*Primary Examiner* — Christopher R Demeree
(74) *Attorney, Agent, or Firm* — Harness, Dickey & Pierce, P.L.C.

(57) ABSTRACT

A method and system for producing an insulated mailer and an insulated box having an insulative paper fiber pad substructure with a density of less than about 10 pounds per cubic foot. The insulative paper fiber pad has entangled reinforcement fibers. A method of forming an insulative paper fiber pad using recycling-compatible or water soluble adhesive and paper layers is provided.

34 Claims, 22 Drawing Sheets

Related U.S. Application Data filed on Nov. 9, 2016, provisional application No. 62/437,365, filed on Dec. 21, 2016.

(51) Int. Cl.
| | |
|---|---|
| *B65D 5/02* | (2006.01) |
| *B32B 29/00* | (2006.01) |
| *B32B 29/02* | (2006.01) |
| *B32B 29/08* | (2006.01) |
| *B32B 27/32* | (2006.01) |
| *B32B 7/14* | (2006.01) |

(52) U.S. Cl.
CPC .... *B65D 81/3858* (2013.01); *B32B 2260/028* (2013.01); *B32B 2260/046* (2013.01); *B32B 2398/20* (2013.01); *B65D 2565/384* (2013.01); *B65D 2565/385* (2013.01); *Y02W 30/803* (2015.05); *Y02W 90/11* (2015.05)

(56) References Cited

U.S. PATENT DOCUMENTS

| | | | |
|---|---|---|---|
| 5,418,031 | A † | 5/1995 | English |
| 5,491,186 | A | 2/1996 | Kean et al. |
| 5,516,580 | A † | 5/1996 | Frenette |
| 6,875,486 | B2 | 4/2005 | Miller |
| 6,910,582 | B2 | 6/2005 | Lantz |
| 7,094,192 | B2 | 8/2006 | Schoenberger et al. |
| 7,229,677 | B2 | 6/2007 | Miller |
| 8,365,943 | B2 † | 2/2013 | Bentley |
| 8,763,886 | B2 | 7/2014 | Hall |
| 8,795,470 | B2 † | 8/2014 | Henderson |
| 9,605,382 | B2 | 3/2017 | Virtanen |
| 9,611,067 | B2 | 4/2017 | Collison |
| 9,738,420 | B2 * | 8/2017 | Miller .................... B65D 27/16 |
| 9,908,684 | B2 * | 3/2018 | Collison ............... B65D 81/127 |
| 9,920,517 | B2 * | 3/2018 | Sollie ...................... E04B 1/767 |
| 9,981,797 | B2 † | 5/2018 | Aksan ................ B65D 81/3862 |
| 2007/0051782 | A1 * | 3/2007 | Lantz ................... B65D 5/0005 229/103.11 |
| 2009/0193765 | A1 | 8/2009 | Lantz |
| 2009/0283578 | A1 | 11/2009 | Miller |
| 2010/0062921 | A1 * | 3/2010 | Veiseh ................... B65B 5/067 493/186 |
| 2010/0072105 | A1 | 3/2010 | Glaser et al. |
| 2011/0042449 | A1 * | 2/2011 | Copenhaver ......... B65D 81/382 229/103.11 |
| 2011/0114513 | A1 | 5/2011 | Miller |
| 2011/0311758 | A1 | 12/2011 | Burns et al. |
| 2012/0145568 | A1 † | 6/2012 | Collison et al. |
| 2014/0093697 | A1 | 4/2014 | Perry et al. |
| 2014/0319018 | A1 | 10/2014 | Collison |
| 2016/0325915 | A1 | 11/2016 | Aksan et al. |
| 2017/0015080 | A1 | 1/2017 | Collison et al. |
| 2017/0225870 | A1 | 8/2017 | Collison |
| 2017/0334622 | A1 | 11/2017 | Menzel, Jr. |
| 2017/0341847 | A1 † | 11/2017 | Chase |
| 2017/0369226 | A1 | 12/2017 | Chase et al. |

FOREIGN PATENT DOCUMENTS

| | | |
|---|---|---|
| WO | WO-2016/187435 A2 | 11/2016 |
| WO | WO-2016/187435 A3 | 12/2016 |

\* cited by examiner
† cited by third party

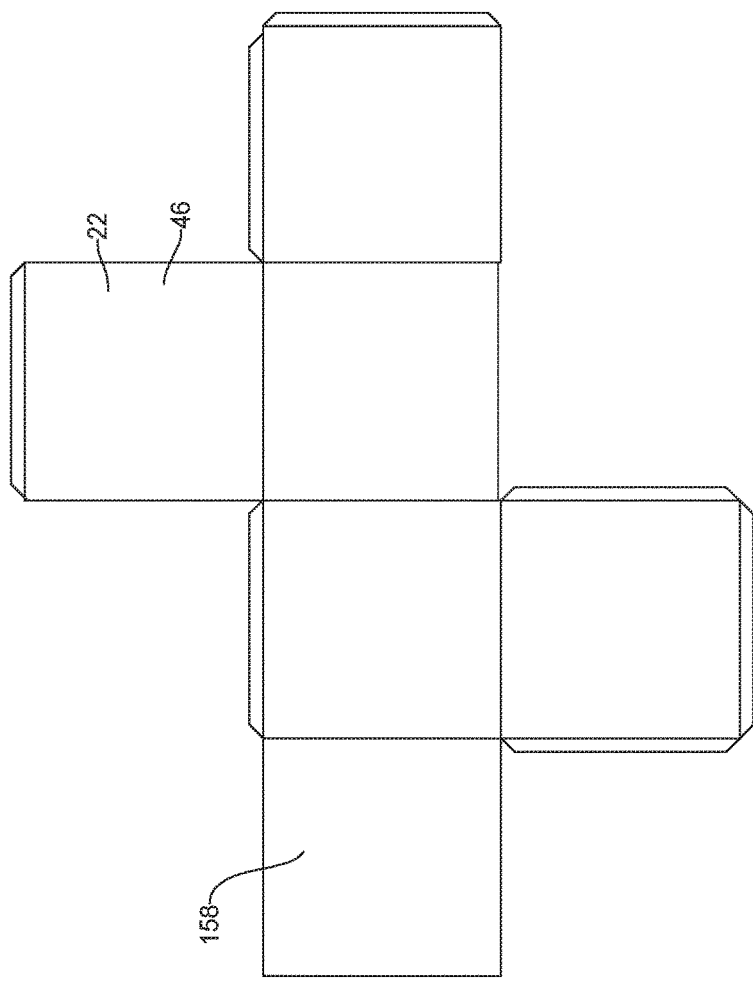
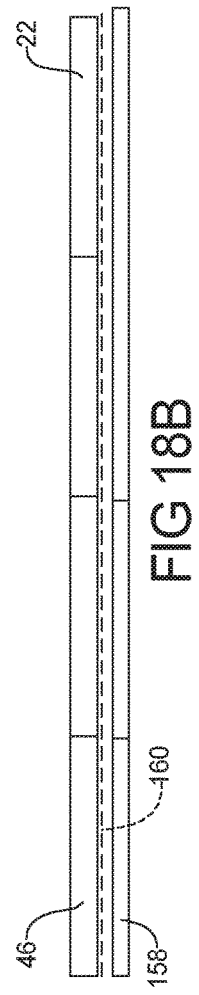
FIG 18A
FIG 18B

METHOD OF MAKING AN INSULATION MATERIAL AND AN INSULATED MAILER

CROSS-REFERENCE TO RELATED APPLICATIONS

This application claims the benefit of U.S. Provisional Application No. 62/375,555, filed on Aug. 16, 2016. This application claims the benefit of U.S. Provisional Application No. 62/419,894, filed on Nov. 9, 2016. This application claims the benefit of U.S. Provisional Application No. 62/437,365, filed on Dec. 21, 2016. The entire disclosure of the above applications are incorporated herein by reference.

JOINT RESEARCH AGREEMENT

The subject matter disclosed was developed and the claimed invention was made by, or on behalf of, one or more parties to a joint research agreement between MP Global Products LLC of Norfolk, NE and Pratt Retail Specialties, LLC of Conyers, Ga., that was in effect on or before the effective filing date of the claimed invention, and the claimed invention was made as a result of activities undertaken within the scope of the joint research agreement.

FIELD

The present invention relates to a method and system for producing insulation materials and containers using the insulation materials as well as the insulation material and containers using the insulation material and more particularly to a method and system for producing repulpable insulation materials, and recyclable containers using repulpable insulation material.

BACKGROUND

Insulated boxes are widely used in many shipping applications. An insulated box is desirable when shipping materials need to be shipped at reduced or elevated temperatures and to help with impact. Similarly, insulated boxes are desirable when shipping materials need to avoid large temperature swings. Such boxes may also lessen impact stresses on the product and thereby lengthen the life of the product being shipped and/or make the product appear to be more durable and of a higher quality. Unfortunately, insulated materials are typically made of disparate materials from those used to form boxes thereby making recycling impossible.

SUMMARY

This section provides a general summary of the disclosure, and is not a comprehensive disclosure of its full scope or all of its features.

According to the present teachings, disclosed is a method of forming a shipping container. The method includes mixing paper fibers with a recycling-compatible fiber to form a mixture of material. The mixture is disposed onto a surface to form a layer of the mixture. At least one of heat and heat and pressure is applied to the layer of the mixture forming a paper fiber batt. The paper fiber batt is then trimmed so it has a fixed width and fixed length. The paper fiber batt is positioned adjacent to a corrugated box, with the shipping container having a repulpability of greater than 85%.

According to an alternate teaching, the methods described above or below, include mixing paper fibers with a meltable polyethylene and polypropylene ("PE/PP") bi-component thermoplastic fiber.

According to the present teachings, disclosed is a method for producing an insulation material. The method includes mixing paper reinforcement fibers with between about 0.5% to about 25% by weight meltable PE/PP bi-component thermoplastic binder fiber having a length less than about 16 mm. The PE/PP bi-component thermoplastic binder fibers are distributed substantially randomly within the paper reinforcement fibers to form a mixture. Heat is applied to the mixture to melt the PE/PP bi-component thermoplastic binder fiber to bind the PE/PP bi-component thermoplastic binder fiber to the paper reinforcement fibers to form a batt. The insulation material has the physical property of being repulpable at a rate greater than 85%.

According to an alternate teaching, in the methods described above or below, the methods include coupling a repulpable paper layer to the batt to form an insulative batt assembly.

According to an alternate teaching, in the methods described above or below, the methods include forming a repulpable paper fiber pad having a compression resistance of between about 0.3 psi and about 1.4 psi at compressions of between about 25% and about 50%.

According to an alternate teaching, in the methods described above or below, the methods include forming a repulpable paper fiber pad having a compression set at about 25% of between about 5% and about 18%.

According to an alternate teaching, in the methods described above or below, the methods include forming disposing a water soluble adhesive layer between the paper fiber pad and the first paper layer.

According to the present teachings, disclosed is method for producing an insulation material. A mixture of paper fiber with between 0.5% and 25% thermoplastic binder fiber distributed substantially randomly within the paper fiber is formed. The mixture is heated to bring the thermoplastic binder fiber above a fiber's glass transition temperature or melting point, thus binding the thermoplastic binder fiber to the paper fiber to form a batt having a density of less than 5 pound per cubic foot. The fibrous web of paper fibers are interlocked with the thermoplastic binder fiber while the batt is subsequently brought to a temperature below the glass transition temperature of the thermoplastic fiber to form an insulative pad that is greater than 85% repulpable. This pad is disposed within one of an interior surface of a repulpable corrugated cardboard box or a repulpable envelope, to form an assembly that is greater than 85% repulpable.

According to an alternate teaching, in the methods described above or below, forming a mixture of paper fiber and thermoplastic binder is forming a mixture of paper fiber with between about 0.5% and about 25% PE/PP bi-component thermoplastic fiber having a length of less than about 24 mm.

According to an alternate teaching, in the methods described above or below, forming a mixture of paper fiber with thermoplastic binder fiber is forming an mixture of paper fiber with between about 5% and about 10% PE/PP bi-component thermoplastic binder fiber having varying lengths and having an average length of less than about 16 mm.

According to the present teachings, containers, shipping containers, insulative materials, and insulative constructions described above or below or produced using the methods described above and below, are greater than 85% repulpable and have a repulpable paper layer and a repulpable paper fiber pad coupled to the paper layer. The paper fiber pad has paper reinforcement fibers interlocked with about 2% to about 25% by weight meltable PE/PP bi-component thermoplastic binder fiber distributed substantially randomly therein.

According to the present teachings in the containers, shipping containers, insulative materials, and insulative constructions described above or below or produced using the methods described above and below, the meltable thermoplastic fiber is a chopped fiber having lengths between about 0.5 mm to about 16 mm.

According to the present teachings, in the containers, shipping containers, insulative materials, and insulative constructions described above or below or produced using the methods described above and below, the meltable thermoplastic fiber can be a chopped fiber PE/PP bi-component having lengths between about 0.5 mm to about 16 mm.

According to the present teachings, the containers, shipping containers, insulative materials, and insulative constructions described above or below or produced using the methods described above and below, further have a repulpable corrugated cardboard disposed adjacent to the paper layer.

According to the present teachings, the containers, shipping containers, insulative materials, and insulative constructions described above or below or produced using the methods described above and below, further have a recycling-compatible or water soluble adhesive layer disposed between the paper layer and the corrugated cardboard.

According to an alternate teaching, in the methods described above or below, the methods include placing lose ground-up fibrous cellulous paper or ground-up cardboard material onto a moving conveyor. The fibers in the fibrous paper or cellulous material can be interlocked by methods such a needling or by use of a melted binder fiber, a bioresorbable adhesive, recycling-compatible, water soluble adhesive, plant based (sugar or pectin) adhesive from, for example, sugar beet, corn, or sugar cane, or starch. The ground up cellulous paper or cardboard material is formed into a slab or batt by passing the continuous layer of material between a pair of tapered edge plates which forms the batt width and thickness of the uncompressed batt. This material can have its thickness and density adjusted using a compression roller which can apply heat.

According to an alternate teaching, in the methods described above or below, the methods include, after compression, the batt being cut into individual pieces using a slicing knife. Optionally, the batt can be cut in half along its thickness using a moving slicing knife or blade. Once the batt is formed into a rectangular shape and thickness, the material is then ready for coupling to or disposing in an inner corrugated box or envelope.

According to an alternate teaching, in the methods described above or below, the methods include taking an inner corrugated box surface off of a roll of appropriate material. The inner corrugated box surface material is cut into specific lengths and widths. For example, the cardboard box inner surface material can have a width and length larger than the width and length of the fibrous batt.

According to the present teachings, containers, shipping containers, insulative materials, and insulative constructions described above or below or produced using the methods described above and below, include a paper layer that can be disposed over the batt, overlapping the expanded portions of the batt underneath all four sides. The ends of the paper layer can be wrapped about and tucked under the ends of the batt. Heat or recycling-compatible or water soluble adhesive can be applied to fix the inner paper layer to the batt.

According to an alternate teaching, in the methods described above or below, the methods include adhering an inner paper layer to the batt on an outside surface of the inner paper layer which can be folded to form a pocket. The folded batt is then placed through an end closure apparatus which closes the side of the inner paper layer, thus forming a pocket. The edges of the folded batt can be sewn shut using an industrial sewing machine.

According to an alternate teaching, in the methods described above or below, the methods include positioning another paper layer about the outside of the folded batt. The outer paper layer can be positioned about the batt on the inner paper layer in a manner which forms a closable flap. This closable flap can include a recycling-compatible or water soluble adhesive in the form of dual sided tape.

According to an alternate teaching, in the methods described above or below, the methods include encapsulating the insulative batt material between the inner and outer paper layer. In this regard, the edge of the outer paper layer can be coupled to the inner paper layer using heat or recycling-compatible or water soluble adhesive, or stitching. Excess material along the edges can be removed.

According to the present teachings, insulative materials, and insulative constructions described above or below or produced using the methods described above and below, can include forming cellulous fibers by passing recycled cardboard through a hammer mill. These fibers are mixed with paper and with one of a recycling-compatible fiber. The recycling-compatible fiber can be a meltable thermoplastic fiber. An insulative paper fiber batt having a first width and first length is formed from the recycled paper fibers. A first paper layer is coupled to the paper fiber batt. The paper fiber batt is coupled to a corrugated box.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIGS. 18a-18b represent the insulative batt coupled to a corrugated box.

Corresponding reference numerals indicate corresponding parts throughout the several views of the drawings.

DETAILED DESCRIPTION

Example embodiments will now be described more fully with reference to the accompanying drawings.

Figure 1:
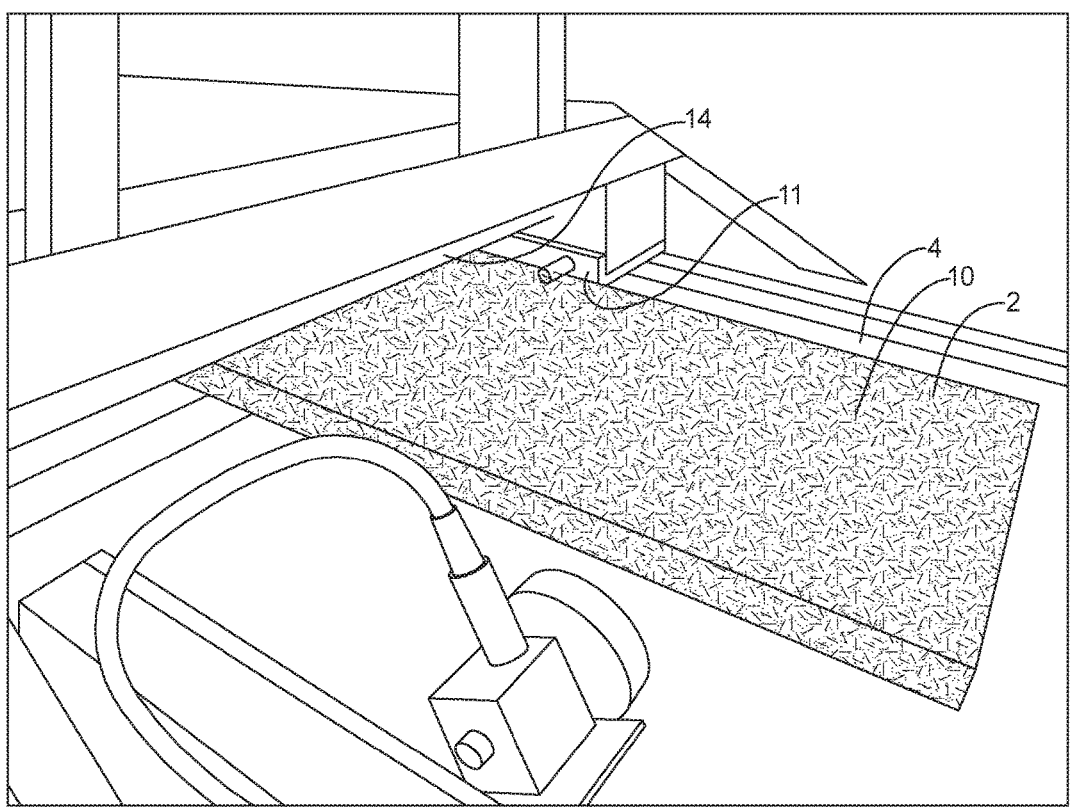
FIG. 1 represents the formation of an insulative batt or pad for an insulative mailer.

The formation of an insulated material and an insulated mailer or a shipping container will be described in the description of FIGS. 1-12. As shown in FIG. 1, fibrous paper or cellulous material 2 is placed onto a moving conveyor 4. The fibers can be interlocked by methods such a needling or by use of a melted binder which represents about 2% to about 25% of the fiber by weight which is mixed within the fibrous paper or cellulous material. Alternatively, the fibers can be bound using recycling-compatible or water soluble adhesive. The fibrous paper or cellulous material 2 is formed into a slab 10 by passing the continuous layer of material 2 between a pair of tapered edge plates 11 (only one shown) that form the batt width. The thickness of the uncompressed slab 10 can be defined by an upper rake or block 14. This material can then have its thickness and density adjusted using a compression roller 16 (FIG. 3).

After compression, the slab 10 is converted to a paper fiber insulative batt 22 (FIG. 2), which can be manufactured fiber compositions formed by passing recycled cardboard through a mill such as a hammer mill. The batt 22 can contain small amounts of water soluble adhesive or meltable fibers such a polypropylene fiber. Optionally, randomly distributed natural fibers such as cotton and binder fibers having lengths between about 1/16 inch to about 1.5 inches and a denier of between about 5 and about 12 are used to form the paper fiber batt 22, which is processed to form an insulative pad 46 (FIG. 3).

Additionally, the binder fibers can be a water soluble PVOH fiber which can have a denier of about 0.02 to about 3.0, a water temperature at more than about 100 degrees C., and a cut length of about 2 mm to about 8 mm. The binder fiber can be, for example, a KURALON (™) brand short cut fibers. As a binder fiber, the recyclable PVOH fiber used in the insulation can be about a 0.4 denier to about a 1.0 denier fiber having a length of about 3.0 to about 4.0 mm.

The insulative material 22 is continuously fed on the conveyor 4 between a pair of side guides which define a pair of sides for a continuous strip of insulative material. The side guides define a predetermined width for the pad. Once aligned, the continuous strip of material is positioned under a slicing mechanism which cuts the continuous batt 22 into predefined lengths, thus forming the insulative pad 46.

Figure 2:
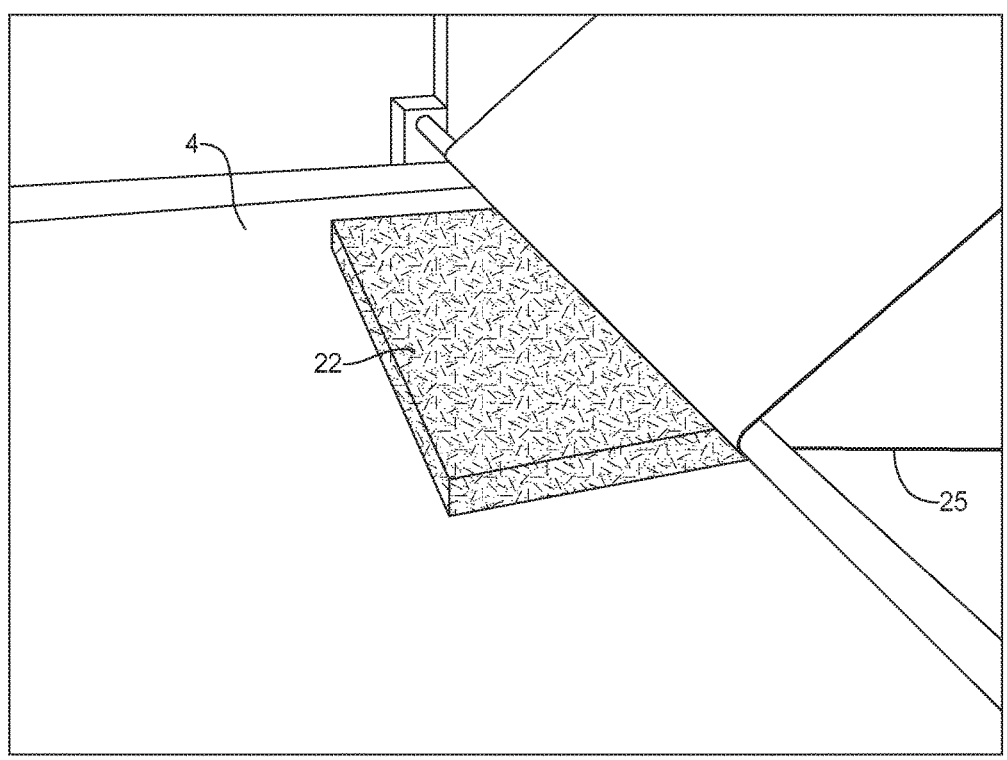
FIG. 2 represents positioning a recyclable paper layer over the insulative pad shown in FIG. 1.
Figure 3:
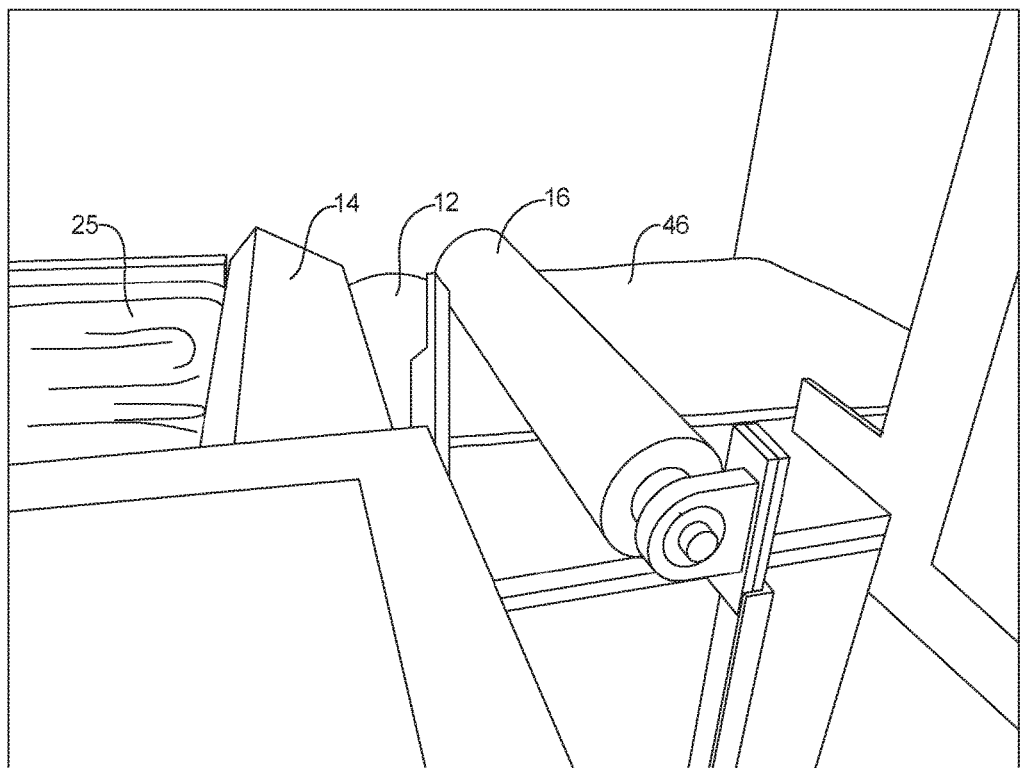
FIG. 3 represents the cutting of the recyclable paper layer positioned over the pad as shown in FIG. 2.

As seen in FIG. 2, the batt 22 is transported via the conveyor 4 to a second location where an inner paper layer 25 is draped over the pad 46. The inner paper layer 25 has a length and a width larger than the length and width of the pad 46. First and second ends 26 of the inner paper layer 25 can be tucked under first and second ends 28 of the pad 46.

As shown in FIG. 3, the batt 22 can then be cut into individual pieces using a slicing knife 12 which can be a rotating band or circular blade. Optionally, the batt 22 can be cut in half along its thickness using the slicing knife 4412. Once the batt 22 is formed into a rectangular shape and thickness, the material is then ready for coupling to or placed adjacent an inner corrugated box inner surface.

Figure 4:
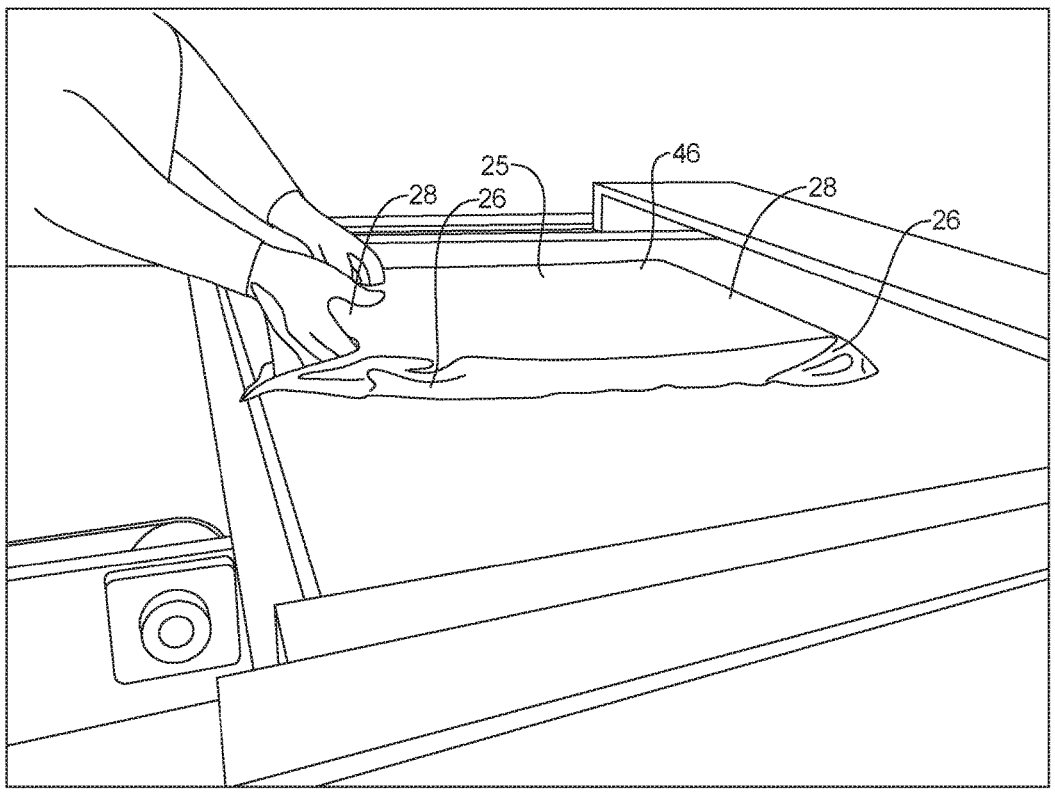
FIG. 4 represents positioning the paper layer about the edges of the pad.

The inner paper layer 25 is taken off of a roll of appropriate material that can for instance be pre-perforated or water proofed. As shown in FIGS. 3 and 4, the paper box inner surface material is positioned over the insulated layer and is cut into specific lengths and widths. For example, the paper box inner surface material can have a width and length larger than the width and length of the fibrous pad 46.

Figure 5:
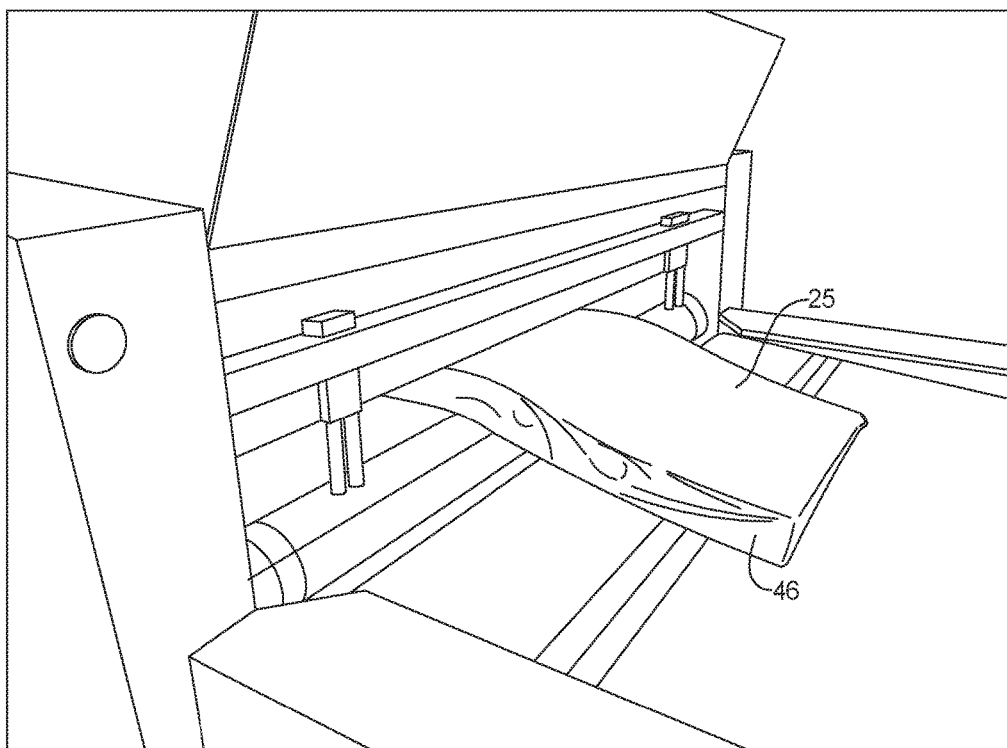
FIG. 5 represents the application of heat to bind the paper layer to the pad.

As shown in FIG. 4, the inner paper layer 25 is disposed over the pad 46, overlapping the pad 46 on all four sides. The ends 26 of the inner paper layer 25 are wrapped about and tucked under the ends 28 of the pad 46. As shown in FIG. 5, heat or recycling-compatible or water soluble adhesive can be applied to fix the inner paper layer 25 to the pad 46. The inner paper layer 25 is then folded in half, placing the pad 46 on an outside surface of the inner paper layer 25 which is disposed against itself, thus forming a subassembly.

Figure 6:
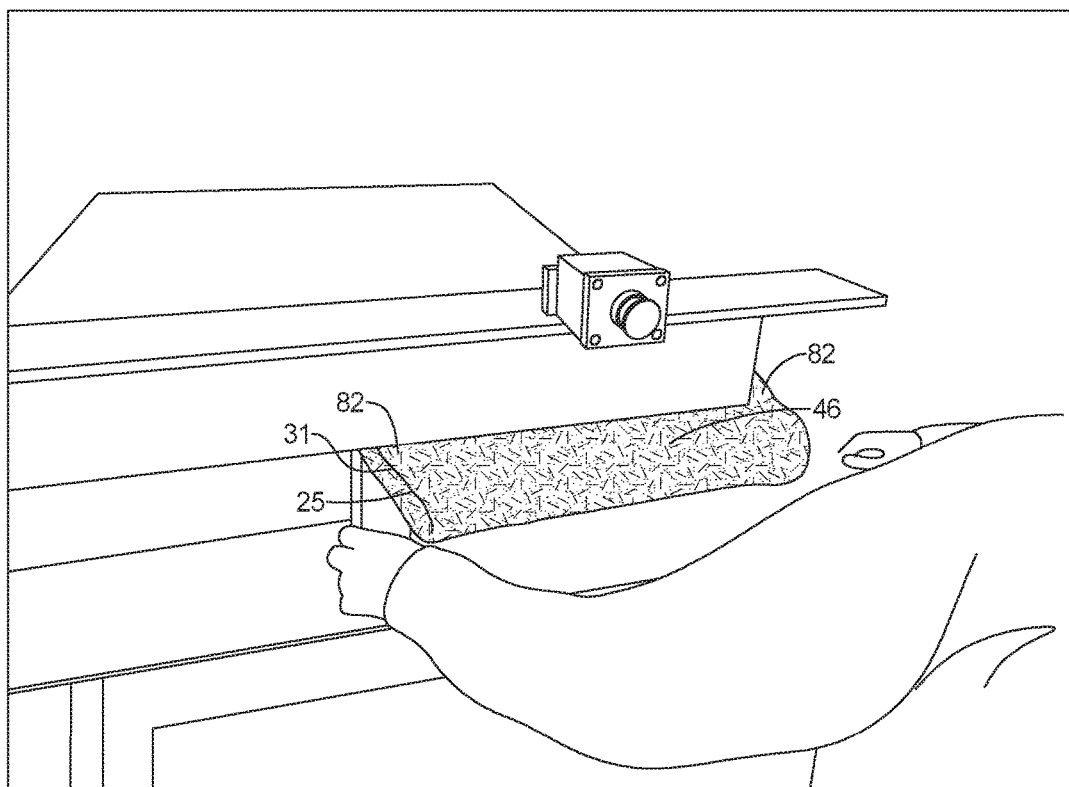
FIG. 6 represents folding the construction of FIG. 5 into a pocket.
Figure 7:
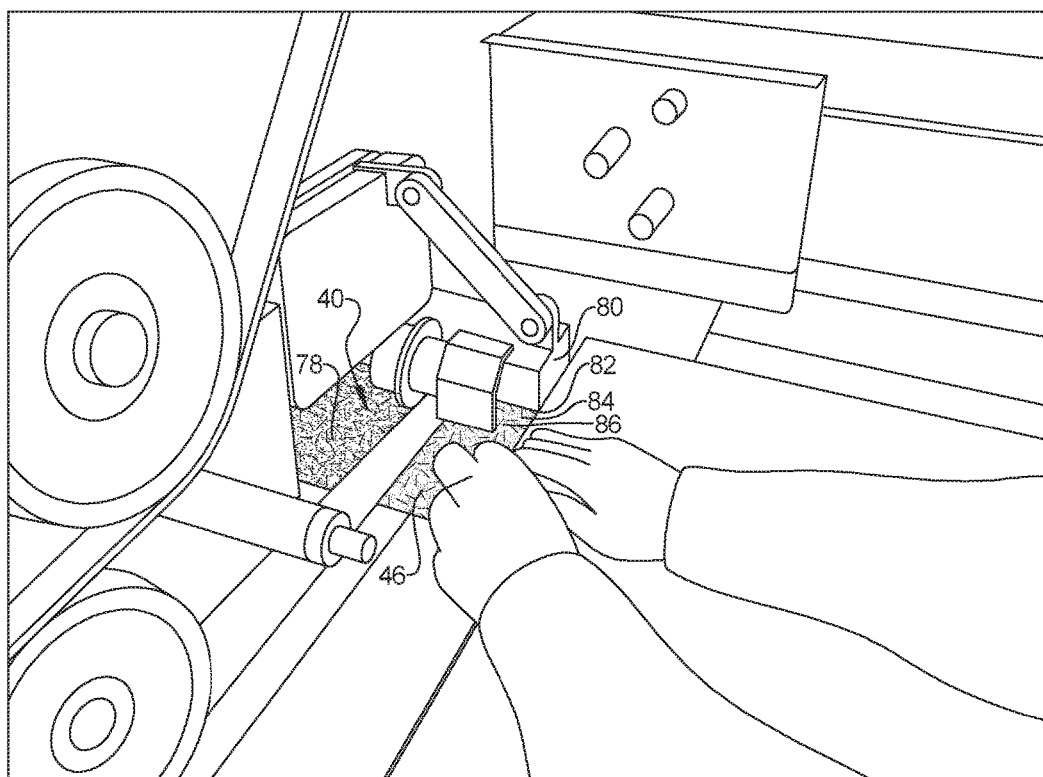
FIG. 7 represents sewing the sides of the construction of FIG. 6 to form a pocket.

As shown in FIG. 6, the folded pad 46 is then placed through an end closure apparatus which closes the sides of the inner paper layer 25, thus forming a pocket 31. As shown in FIG. 7, the edges can be sewn shut using an industrial sewing machine 80 or can be heat staked as appropriate. A row of smaller stitches 84 extend from top to bottom of the subassembly along each side thereof juxtaposed adjacent to the lateral edges 82 of pad 46. Spaced slightly inwardly of stitches 84 is a second row of larger stitches 86 that encompass the pad 46 and the paper layer 44-25 on the inside of the pad 46 and include portions 78 on the outside of the pad 46. The second rows of stitches 86 only extend longitudinally from the top of the subassembly downwardly and terminate with the portions 78.

Figure 8:
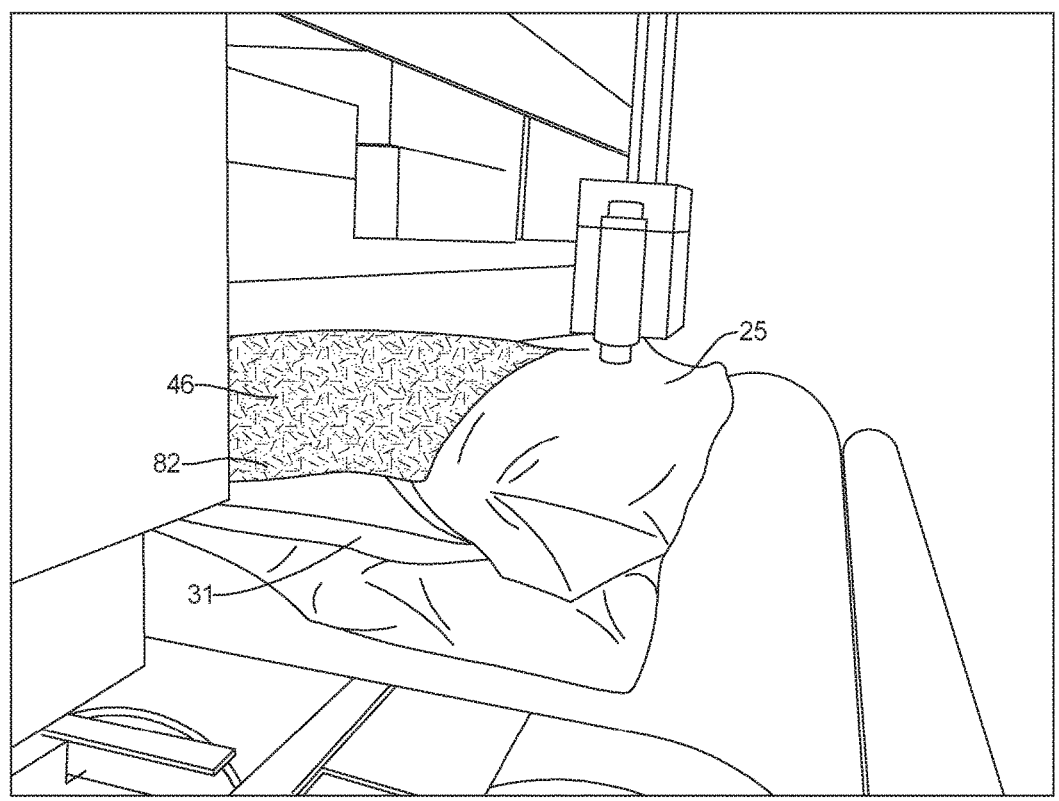
FIG. 8 represents the application of an adhesive.
Figure 9:
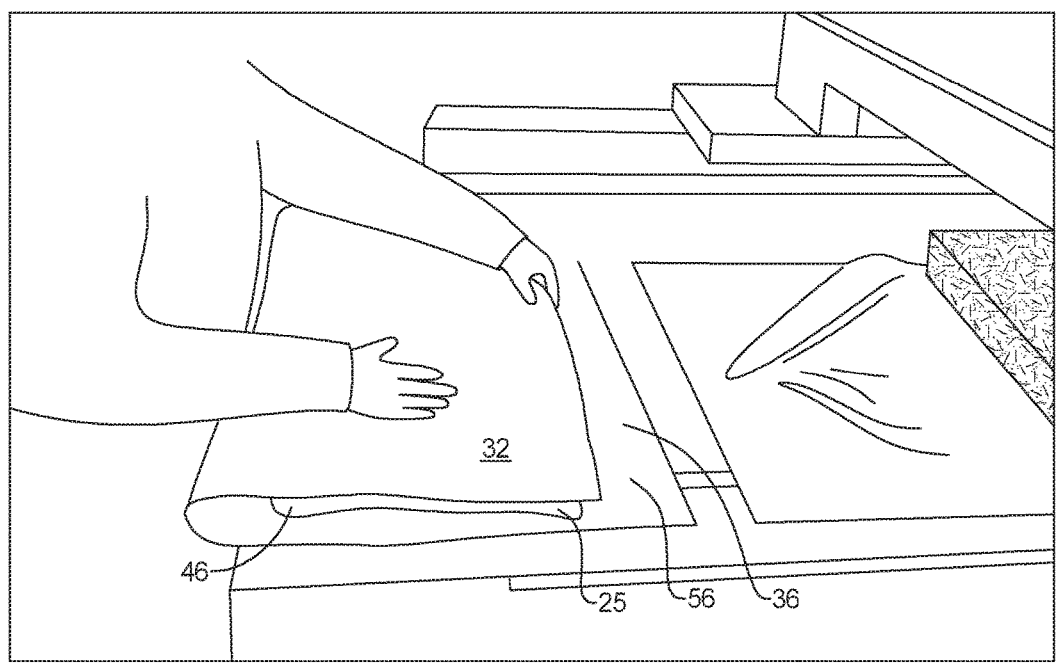
FIG. 9 represents the application of an outer paper layer about the construction of FIG. 8.

FIG. 8 represents the application of the recycling-compatible or water soluble adhesive to assist binding an outer sheet or paper layer 32 to the inner paper layer 25. Shown in FIG. 9, the outer paper layer 32 can then be positioned about the outside of the folded pad 46. The outer paper layer 32 can be positioned about the pad 46 on the inner paper layer 25 in a manner which forms a closable flap 56. This closable flap 56 can take a recycling-compatible or water soluble adhesive 36 in the form of dual sided tape.

Figure 11:
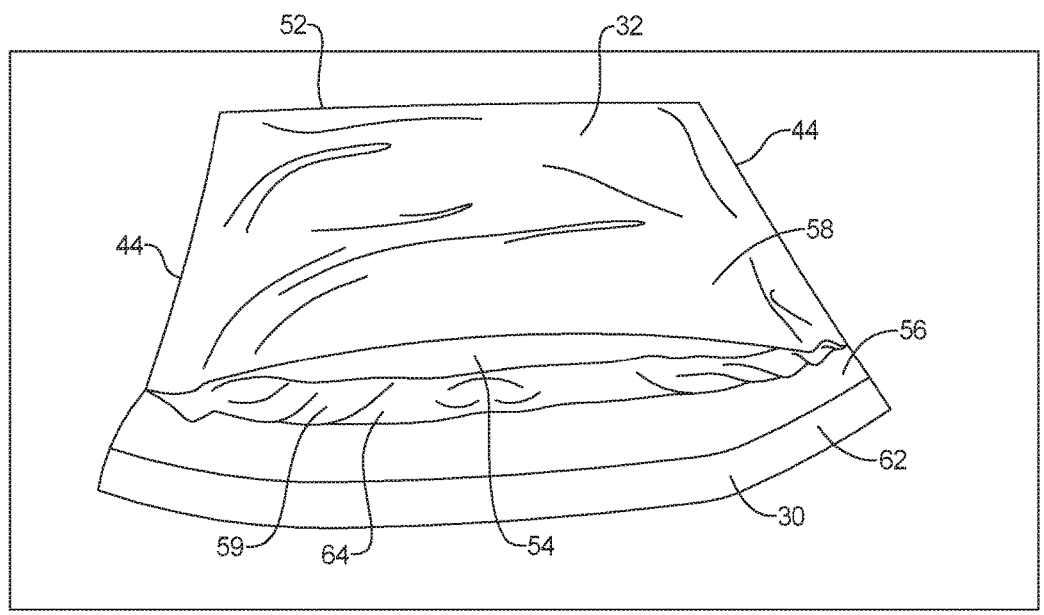
FIG. 11 represents the mailer formed using the methods and systems of FIGS. 1-10.

The outer paper layer 32 is then coupled to the inner paper layer 25, encapsulating the insulative material or pad 46 between the inner and outer paper layers 25 and 32 to form a shipping container or mailer 40 (FIG. 11). In this regard, the edge of the outer paper layer 32 can be coupled to the inner paper layer 25 using heat, recycling-compatible or water soluble adhesive, or stitching. Excess material along the edges can be removed.

Figure 10:
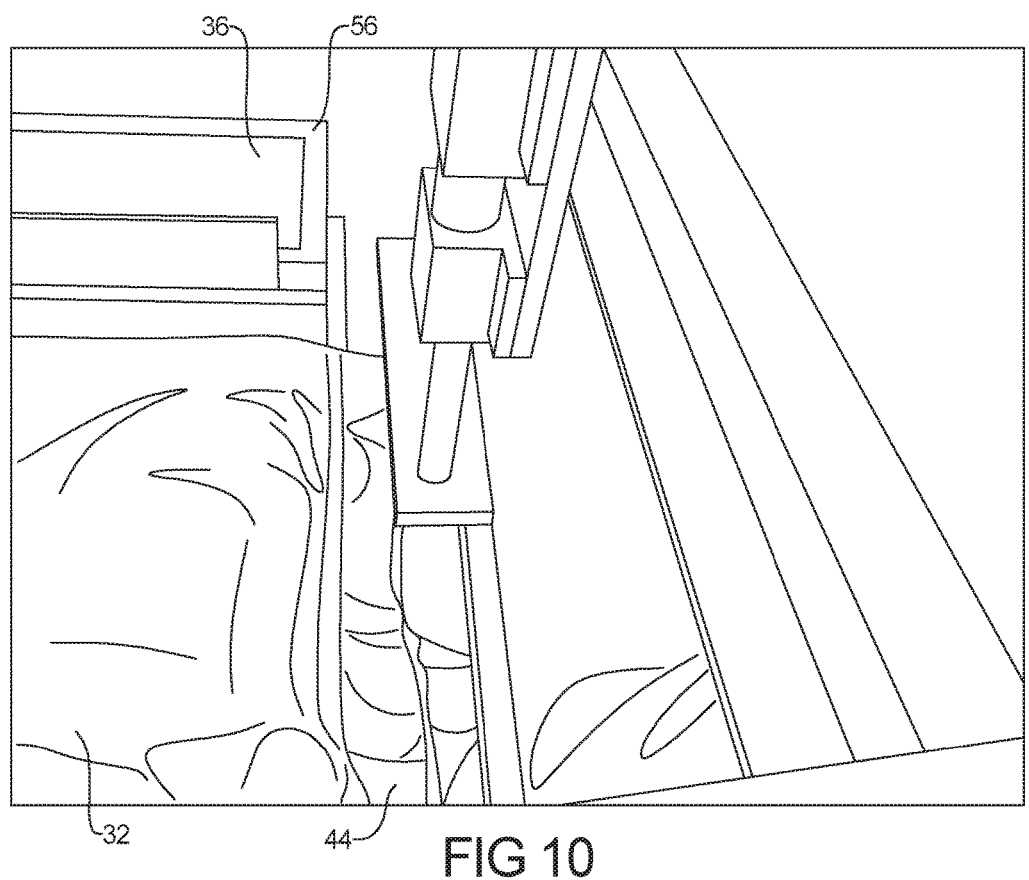
FIG. 10 represents heat sealing and cutting the inner and outer paper layer of the constructions of FIG. 9.

The outer paper layer 32 forming the outer surface of the mailer or shipping container 40 can be recyclable and can be finished so as to be waterproof or water resistant. Optionally, the outer paper layer 32 extends laterally so its lateral edges or margins 44 can be heat sealed together as shown in FIG. 10. At the bottom of the mailer 40, the paper layer 42-32 is folded at 52. At the top of the mailer 40, the front top edge 58 terminates at the mailer opening 54, and the back continues upwardly to form flap 56 to enable the mailer 40 to be sealed by folding the flap 56 over the front top edge 58 of the mailer 40 closing off the opening 54. The flap 56 has a lateral stripe of recyclable or recycling-compatible or water soluble adhesive 30 covered with a removable protecting paper 62.

As evident from the above description, the pad 46 is covered by the inner paper layer 25 on the inside with the inner paper layer 25 extending laterally beyond the pad 46 to lie coextensive with the marginal edges 44 of the outer paper layer 32 so all marginal edges can be heat sealed together. The inner paper layer 25 extends around the longitudinal extremities of the pad 46 so that the end portions 82 of the inner paper layer 25 lie between the pad 46 and the outer paper layer 32 when the pad 46 is located in the mailer 40. These portions 82 enable the inner paper layer 25 to be heat sealed together with the outer paper layer 32 around the mailer opening 54, thereby entrapping the pad 46. The portion of the opening 54 that lies with the flap 56 has pressure-sensitive, biodegradable tape 59 (covered with a protective strip 64) in order to seal the top edges of the inner paper layer 25 together before the flap 56 is sealed to the front of the mailer 40. Apart from the stitching and heat sealing of the outer paper layer 32 to the inner paper layer 25, the pad 46 is not attached to the outer paper layer 32.

The fibers of the pad 46 can, for example, be about 75% recyclable cardboard and paper fiber and about 25% binder fiber having a weight of about 1600 grams per square (GSM) i.e., (75/25). Additional fiber material construction can be about 80/20 recyclable cardboard/paper fiber and binder fiber at about 1500 GSM; about 80/20 recyclable cardboard/paper fiber and binder fiber at about 1400 GSM; about 85/15 recyclable cardboard/paper fiber and binder fiber at about 1600 GSM; about 85/15 recyclable cardboard/paper fiber and binder fiber at about 1500 GSM; about 85/15 recyclable cardboard/paper fiber and binder fiber at about 1400 GSM; and about 90/10 recyclable cardboard/paper fiber and binder fiber at about 1500 GSM, with the first number being the paper cardboard fiber fraction and second number being the bi-component binder fiber fraction (80/20 is about 80% paper fiber and about 20% bi-component). The cardboard/paper fiber component is made of about 50/50 fiberized cardboard/paper up to about 75/25 fiberized cardboard/paper mix.

The batt material can have a density can be about 25 to about 40 grams per cubic meter (kg/m3), a thickness of about 12.5 to about 75 mm, and have fibers (cardboard and binder) with a denier range of about 1 den to about 3 den. The density of the pad 46 is related to the amount of compression of the batt 22 and the percentage of bonding fibers.

Preferably, the material can be formed of about 10% bi-component fiber and about 90% recycled cardboard fiber. The bi-component fiber can be chopped and have a length of less than about 24 mm, less than about 16 mm, or a length between about 0.5 mm to about 16 mm, and can be mixtures of two or more lengths, preferably between about 1 mm to about 16 mm. The mixtures of two or more lengths can have ratios of from about 10% to about 90% of one fiber length to another fiber length and can have an average length of less than about 16 mm.

It was found that for a batt sample of about 1300GSM, about 90% cardboard with the binder being about 10% (with about 50% 1 mm length bi-component fiber and about 50% 6 mm length bi-component fiber), over about 93% of the material is repulpable and therefore recyclable. It should be noted that greater than 85% repulpability is a "passing grade" for recyclability. The bi-component fibers can be between about 0.5 mm and about 16 mm polyethylene and polypropylene ("PE/PP") bi-component; and can be formed of about a 65/35 percent PE/PP mixture. Optionally, the PE/PP ratio can be between about 65/35 and about 50/50. These fibers can be, by way of non-limiting example, ES FIBERVISIONS® Polyethylene/polypropylene fiber, including EAC, EPS, ESC, ESE, EDC, Herculon T426 and Herculon T457 versions of fibers.

It was found that a sample of insulation material according to the present teachings, when tested for repulpability is repulpable and therefore recyclable. The insulation material can be repulpable in accordance with the requirements of the Aug. 16, 2013, revision of the "Voluntary Standard For Repulping and Recycling Corrugated Fiberboard Treated to Improve Its Performance in the Presence of Water and Water Vapor" provided by the Fibre Box Association of Elk Grove Village, Ill. which is hereby incorporated in its entirety. In the present aspect, the insulation material can be recyclable in accordance with the requirements of the Aug. 16, 2013, revision of the "Voluntary Standard For Repulping and Recycling Corrugated Fiberboard Treated to Improve Its Performance in the Presence of Water and Water Vapor" provided by the Fibre Box Association of Elk Grove Village, Ill. Containers that include the insulation material can be single-stream recyclable wherein all materials comprised by the container can be recycled by a single processing train without requiring separation of any materials or components of the container. The repulpability test results were as follows:

| | | |
|---|---|---|
| Is sample representative of the material as a whole? (Y/N) | Y | Y |
| STARTING SAMPLE | | |
| Moisture Content | 7.3% | 7.3% |
| Temperature Range | 128° F. | 128° F. |
| Amount of Fiber in Charge | 25 g | 25 g |
| Temp & pH Maintained? (Y/N) | Y | Y |
| Hot Slurry Charged to Flat Screen, as Instructed? (Y/N) | Y | Y |
| FINISHED SAMPLE: Oven dry mass | | |
| Amount of Fiber Rejects | 1.246 g | 1.261 g |
| Amount of Fiber Accepts | 17.84 g | 17.27 g |
| Yield of Sample (% Accepts) | 93.5% | 93.2% |
| Observe and note deposition on vessel walls, screens, moving parts, etc. | | |
| Deposition Observed? (Y/N) If yes, detail below. | N | N |

It was found that for a batt sample of about 1300 GSM, about 90% cardboard with the binder being about 10% 1 mm bi-component fiber, over about 98% of the material is repulpable and therefore recyclable. The insulations and shipping containers of the present teachings are more than 85% repulpable with 85% repulpability being a "passing grade" for recyclability. The repulpability test results were as follows:

| | | |
|---|---|---|
| Is sample representative of the material as a whole? (Y/N) | Y | Y |
| STARTING SAMPLE | | |
| Moisture Content | 7.3% | 7.3% |
| Temperature Range | 128° F. | 128° F. |
| Amount of Fiber in Charge | 25 g | 25 g |
| Temp & pH Maintained? (Y/N) | Y | Y |
| Hot Slurry Charged to Flat Screen, as Instructed? (Y/N) | Y | Y |

-continued

| FINISHED SAMPLE: Oven dry mass | | |
|---|---|---|
| Amount of Fiber Rejects | 0.391 g | 0.296 g |
| Amount of Fiber Accepts | 17.83 g | 19.28 g |
| Yield of Sample (% Accepts) | 97.9% | 98.5% |
| Observe and note deposition on vessel walls, screens, moving parts, etc. | | |
| Deposition Observed? (Y/N) | If yes, detail below. | N  N |

Thermoplastic binder fibers are provided having a weight of less than about 0.2 pounds per square foot and, more particularly, preferably about 0.1875 pounds per square foot. The remaining reinforcement fiber is greater than about 0.8 pounds per square foot, and preferably about 1.0625 pounds per square foot. The binder fibers are preferably a mixture of fibers and paper components passed through a hammer mill.

The materials according to the present teaching can have a compression resistance of between about 0.3 psi and about 1.4 psi for compression thickness between about 25% and about 50%. For example, a ⅛" insulation pad has a compression resistance at about 25% thickness of about 0.451 psi. The same ⅛" pad has a compression resistance at about 30% of about 0.564 psi. The same ⅛" pad has a compression resistance at about 50% of about 1.81 psi. A ¼" pad has a compression resistance at about 25% of about 0.425 psi. The same ¼" pad has a compression resistance at about 30% of about 0.547 psi. The same ¼" pad has a compression resistance at about 50% of about 1.566 psi. A ½" pad has a compression resistance at about 25% of about 0.356 psi. The same ½" pad has a compression resistance at about 30% of about 0.458 psi. The same ½" pad has a compression resistance at about 50% of about 1.36 psi. The same ½ " insulation pad can have a tear resistance of between about 8.4 and about 8.8 lbs.

When an Insulated pad of the present disclosure is tested according to ASTM Specification C165-07 about 50% relative humidity, the material has a modulus of elasticity of about 2.64 psi. With a load of about 0.020 psi, it sees about a 5% strain. With a load of about 0.29 psi it sees about a 10% strain, and with a load of about 0.4 psi it sees about a 15% strain. The density of the material can be less than about 5 pounds per cubic foot and preferably about 3.5 pounds per cubic foot. The thermal conductivity of the material can be about 0.254 (BTU in/h ft^Temp F), the thermal resistance can be about 1.577 (Temp F Ft^2 H/BTU), and the thermal resistivity can be about 3.943 (Temp F Ft^2 h/BTU in). When tested according to ASTM Specification C518-15, the tested pad also has an R value of about 1.577.

The insulative pad 46 is formed by heating the paper fiber batt 22 in the oven to a temperature greater than about 350° F. and, more preferably, to a temperature of about 362° F. Such heating causes the binder fibers to melt and couple to the non-binder fibers, thus causing fibers to adhere to each other and solidify during cooling. Upon cooling, the binder fibers solidify and function to couple the non-binder reinforcement fibers together as well as function as reinforcement themselves.

The insulative paper fiber batt 22 is heated to form the insulative pad 46 so it has a density of less than about 10 pounds per cubic foot. The insulative pad 46 preferably has a density of less than about 10 pounds per cubic foot and, more preferably, about 8.3 pounds per cubic foot with a thickness of about ¼ inch.

Figure 12:
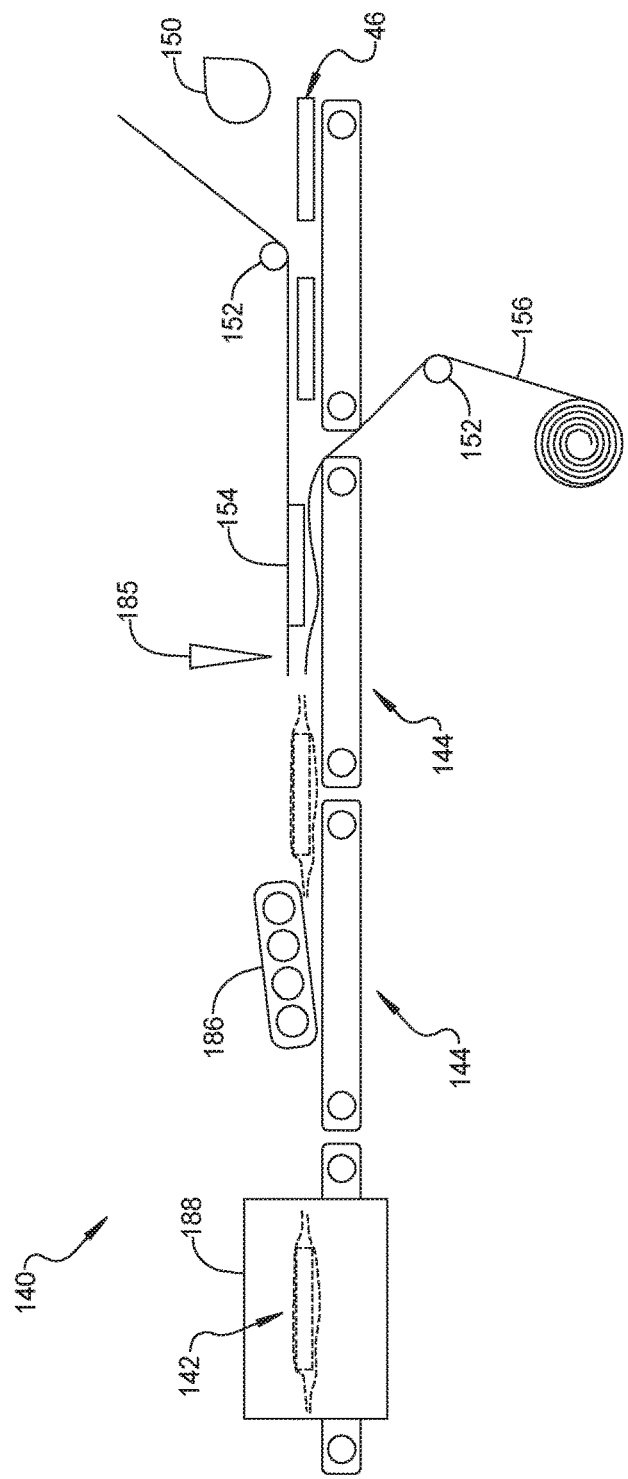
FIG. 12 represents a system to form a box liner according to another teaching of the present invention.

FIG. 12 represents a system 140 to form an insulation liner 142 for a folded box according to another teaching of the present teachings. Generally, the system 140 utilizes a plurality of linked conveyors 144 to move an insulated pad 46 as described above through a series of processes to form the insulation liner 142. The system 140 uses a cutting apparatus 150 to separate the insulated pad 46 from a continuous batt 22. A series of rollers 152 are then used to position an upper paper layer 154 and a lower paper layer 156 about the insulated pad 46. A second cutting apparatus 185 can be used to separate the upper paper layer 154 and a lower paper layer 156 from the continuous paper layer supply. Additionally or alternatively, a sealing and cutting apparatus 186 can be used to cut and seal the edges of the upper and lower paper layers about the insulated pad 46. A heat tunnel can be positioned about a conveyor to couple the paper sheet-layers 154, 156 about the insulated pad 46 to form the insulation liner 142.

Figure 13A:
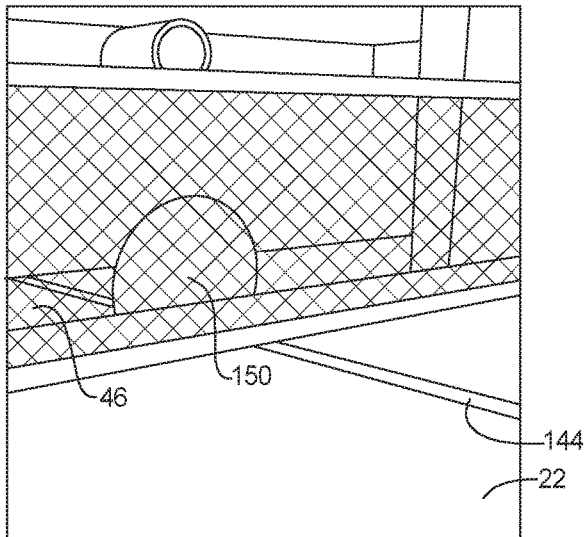
FIGS. 13a-13b represent the cutting of and formation of an insulative batt or pad.
Figure 13B:
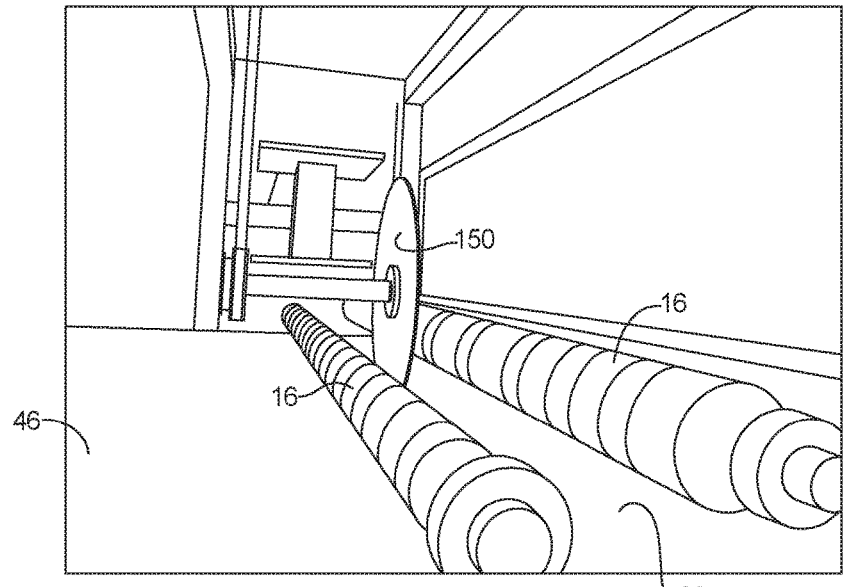

FIGS. 13a-13b represents the cutting of and formation of an insulative pad 46 from the continuous batt 22. As shown, the batt 22 and pad 46 are transported along the plurality of linked conveyors 144. The cutting apparatus 150 can be a circular blade. Additionally, the cutting apparatus 150 can be a belt blade.

Optionally, the pad 46 can be sliced cross-wise to form two batts having a partial thickness pad that may be of equal thickness (i.e., the textile insulative pad is split in half), or that may be of unequal thickness. The present invention is capable of forming a partial thickness batt of about 1/16 of an inch or greater. The starting insulative pad may be split longitudinally to provide two, three, or more partial thickness batts.

In the present invention, it has been found that the insulative pad 46 may be controllably and accurately split if the feed rollers are positioned within a predetermined distance from the splitting knife. The distance is important because of the compressible and pliable nature of the insulative pad. In the preferred embodiment, the predetermined distance is from about zero to about two millimeters.

The thermoplastic binder fibers and reinforcement fibers are laid randomly yet consistently in x-y-z axes. The reinforcement fibers are generally bound together by heating the binder fibers above their glass transition temperature. Typically, less than about 20% by weight binder fiber is used, and preferably about 10% binder fiber is used to form the insulative pad.

Thermoplastic binder fibers are provided having a weight of less than about 0.2 pounds per square foot and, more particularly, preferably about 0.1875 pounds per square foot. The remaining reinforcement fiber is greater than about 0.8 pounds per square foot, and preferably about 1.0625 pounds per square foot. The binder fibers are preferably a mixture of thermoplastic polymers which comprise polyethylene/polyester or polypropylene/polyester or combinations thereof.

Figure 14A:
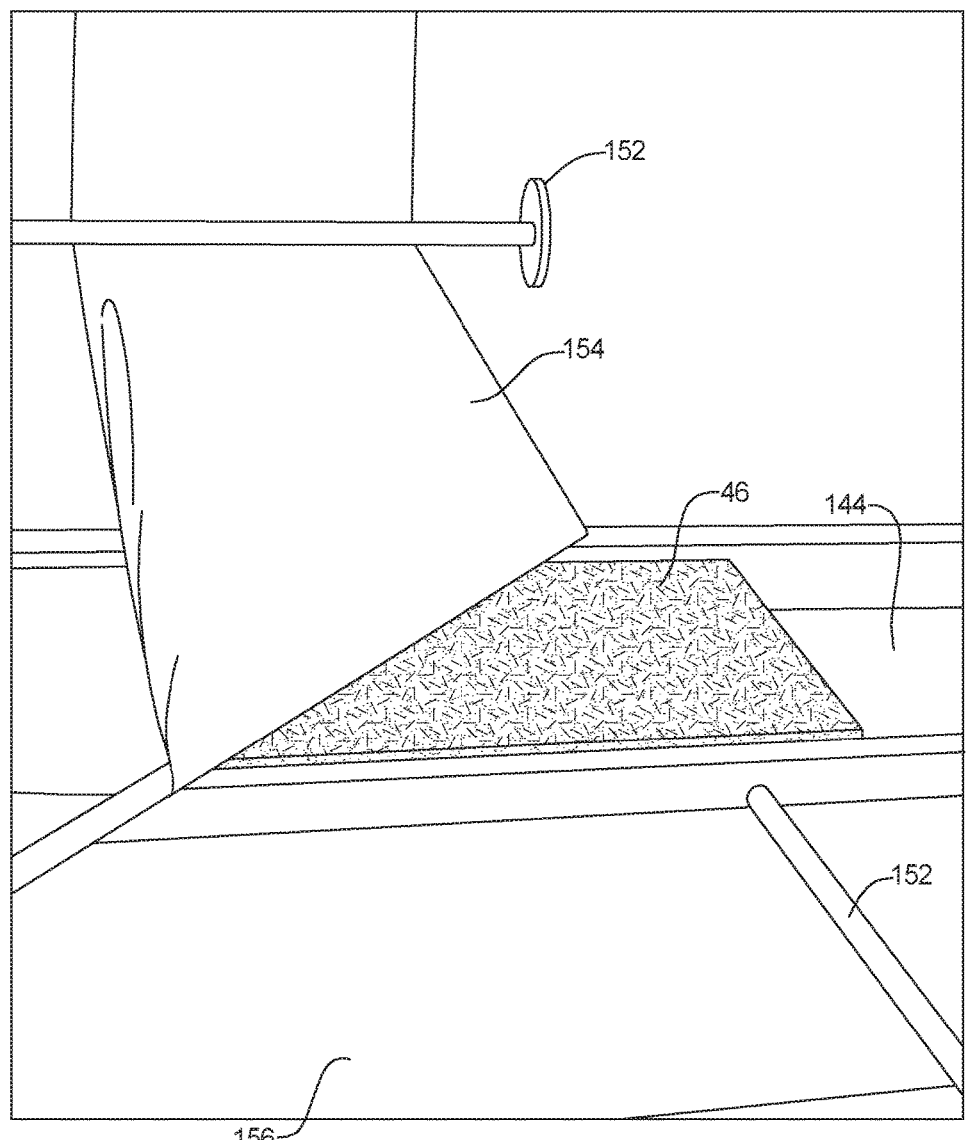
FIGS. 14a-14c represent the application of an upper paper layer according to the present teachings.
Figure 14B:
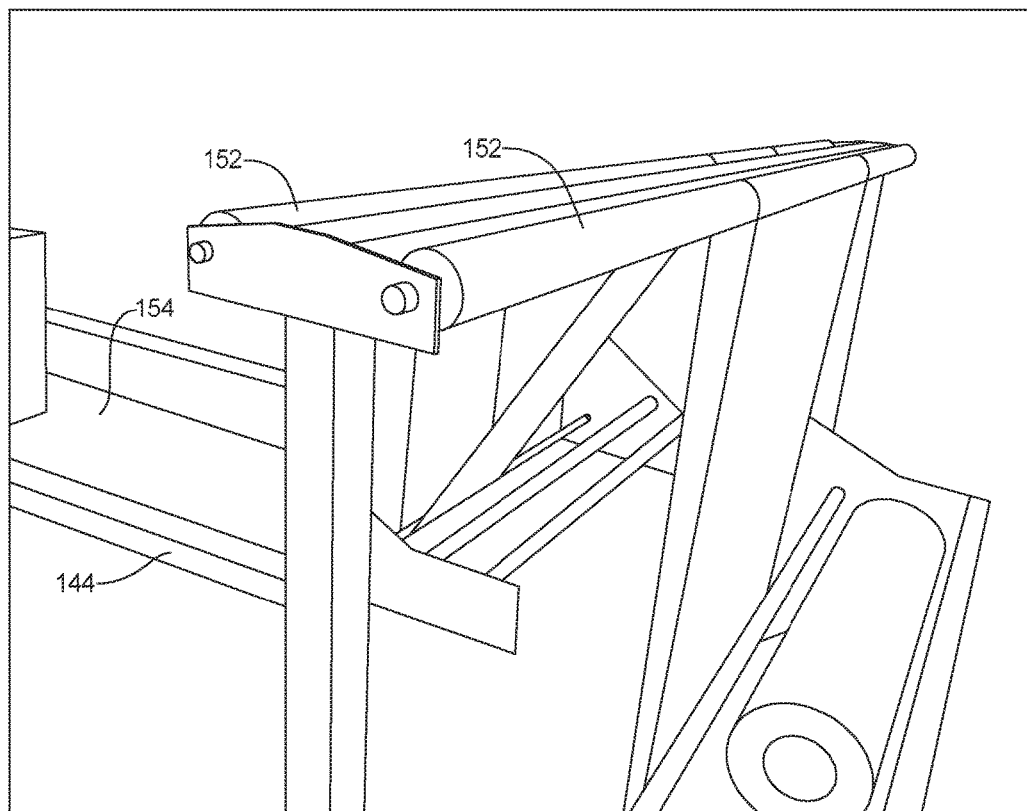
Figure 14C:
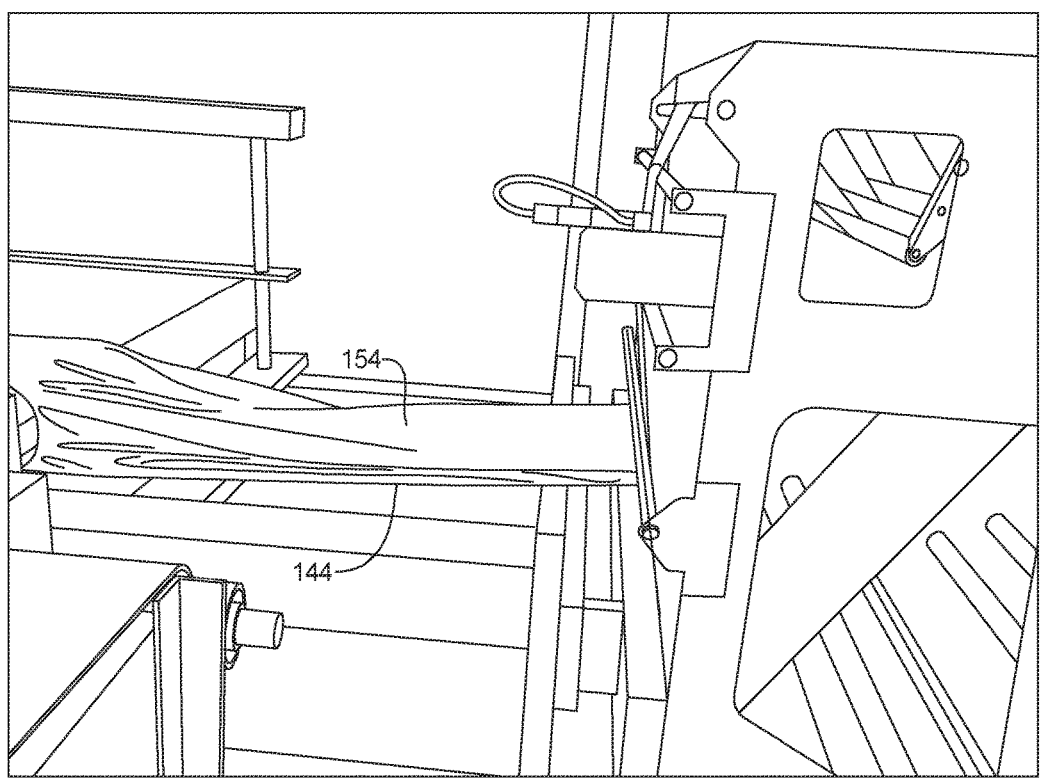

FIGS. 14a-14c represents the application of an upper paper layer according to the present teachings. The series of rollers 152 are then used to position the upper paper layer 154 and the bottom paper layer 156 about the insulated pad 46. As shown, the roller 152 can be positioned at an angle which is non-perpendicular to the direction of the moving conveyor. Preferably, this angle can be about 45 degrees to the direction of flow of the conveyor.

Figure 15A:
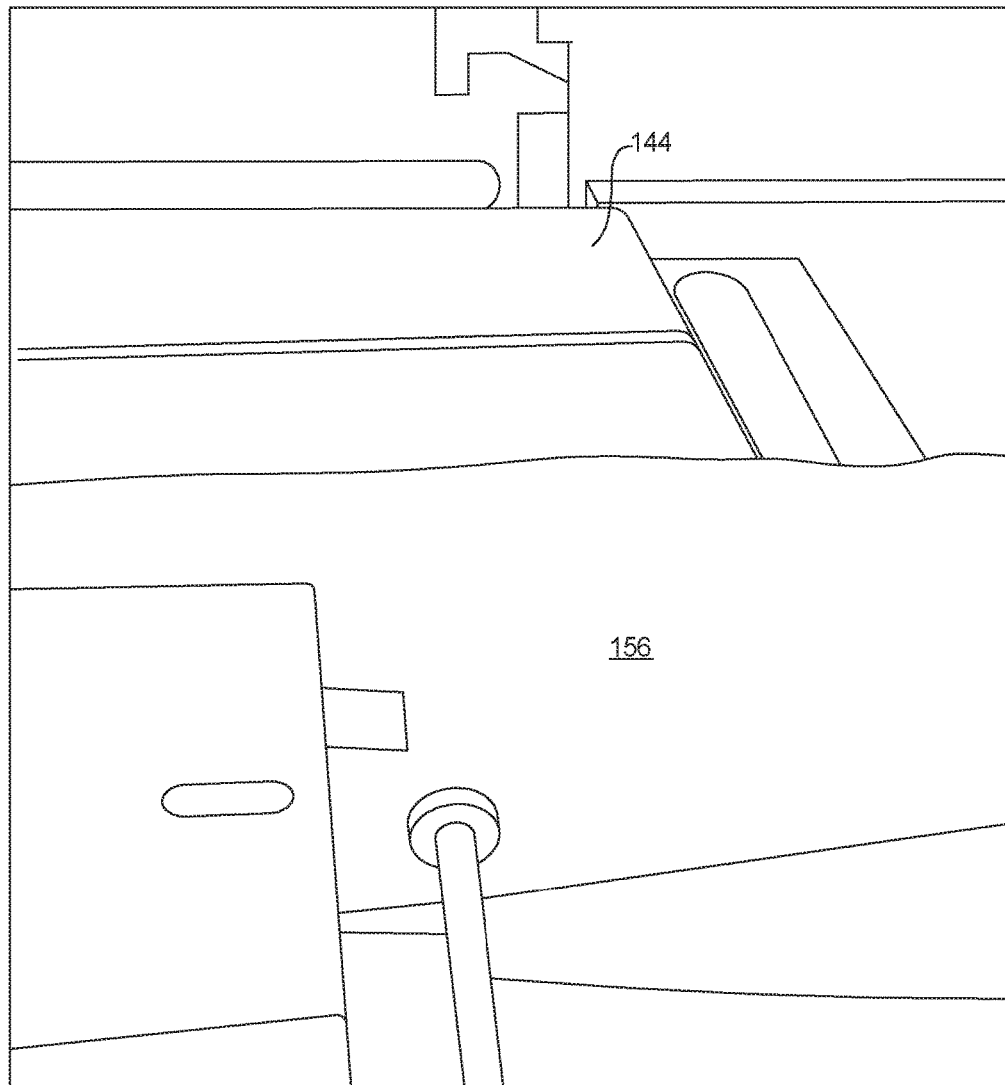
FIGS. 15a-15b represents the application of an optional bottom paper layer.
Figure 15B:
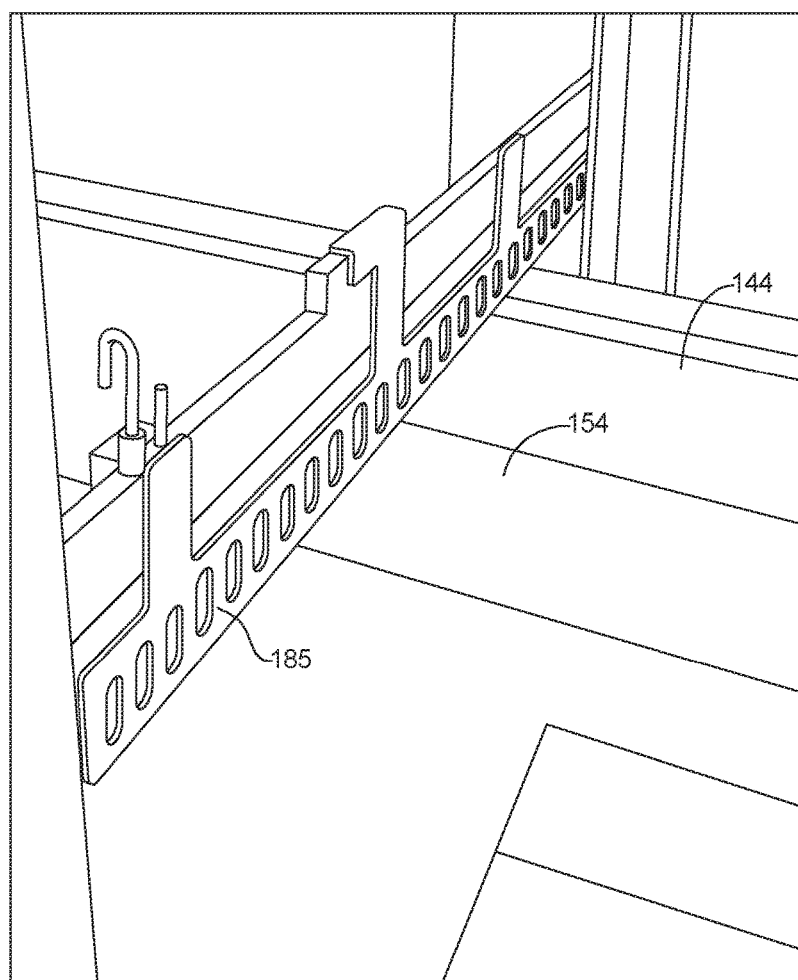

FIGS. 15a-15b represents the application of the bottom paper layer 156. Once the upper paper layer 154 is positioned above the pad 46, the rollers 152 can position the lower paper layer 156 below the pad 46 at the intersection of two conveyors 144. The second cutting apparatus 185 is used to separate the upper paper layer 154 and the lower paper layer 156 from the continuous paper layer supply.

Figure 16A:
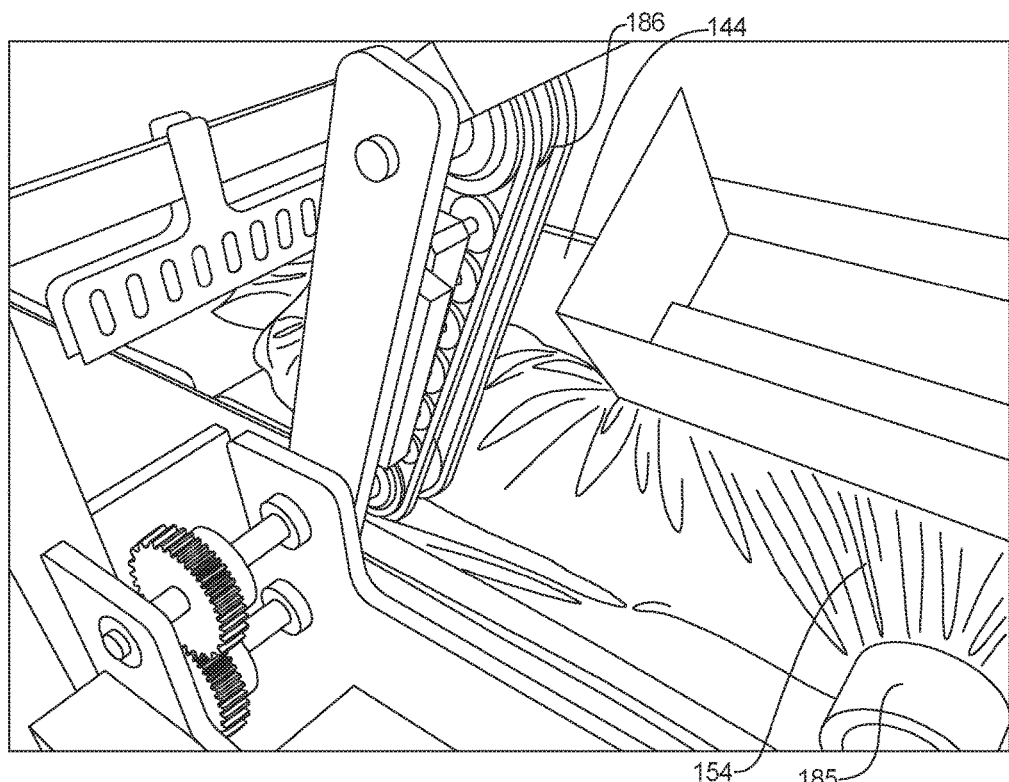
FIGS. 16a and 16b represent side sealing of the paper layers about the insulative member.
Figure 16B:
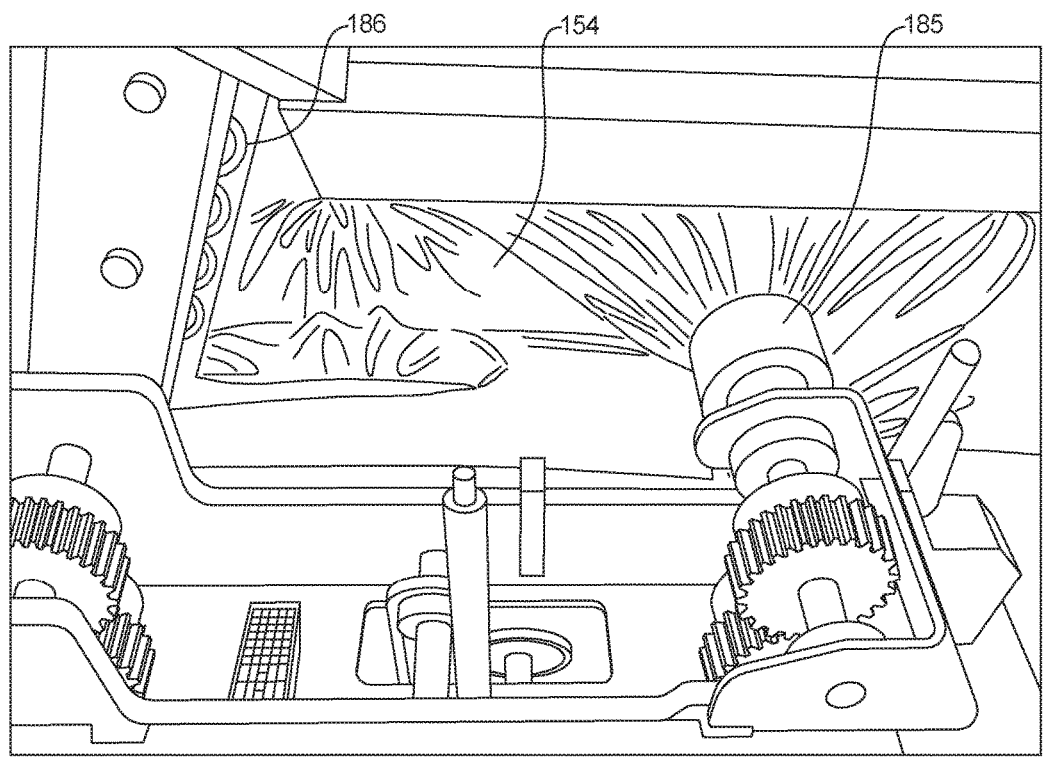

FIGS. 16a and 16b represent side sealing of the paper layers 154, 156 about the insulative member. In this regard, a series of cutting and sealing rollers 186 both cut and seal the sides of the paper layers 154, 156 using recycling-compatible or water soluble adhesive. The cutting and sealing rollers 186 are biased onto the paper layers 154, 156 using a load such as a spring.

Figure 17:
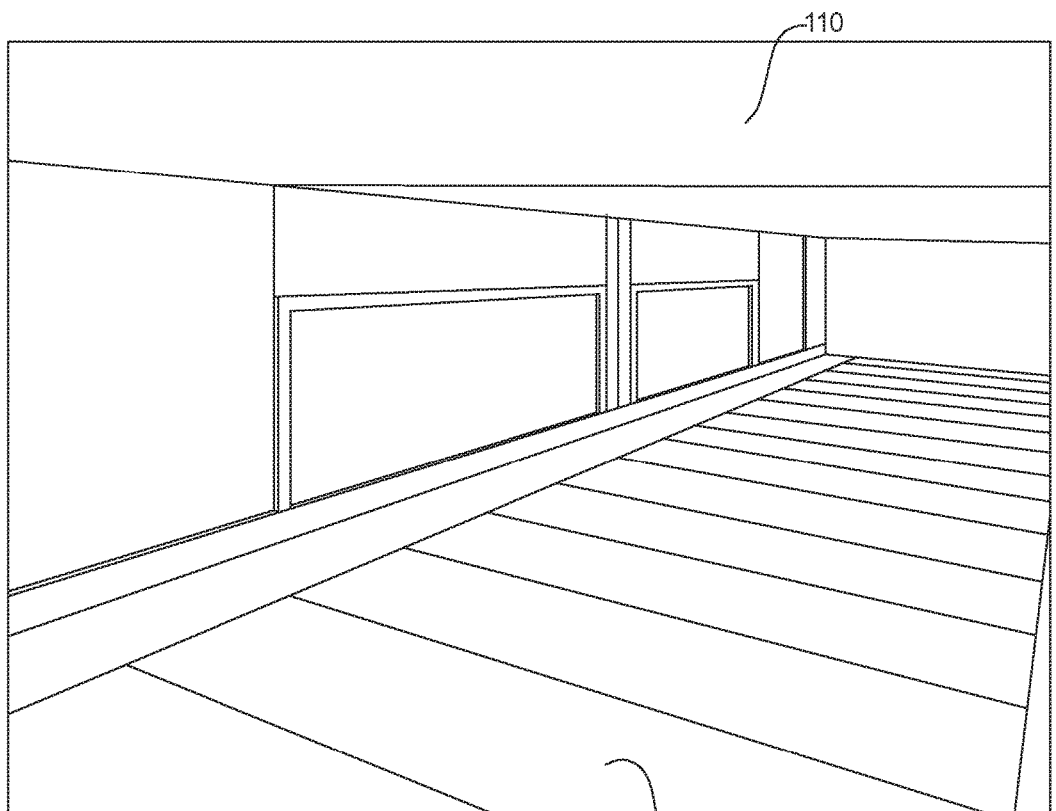
FIG. 17 represents a heat tunnel used to form the insulative member according to the present teachings.

FIG. 17 represents the heat tunnel 110 optionally used to form the box insulative member or insulative batt according to the present teachings should a heat sensitive recycling-compatible or water soluble adhesive be used. Once the construction is sealed on all sides, the subassembly is passed through the heat tunnel 110, which seals the upper and lower paper layers 154 and 156 about the insulative pad 46.

As shown in FIGS. 18a and 18b, the insulative batt 22 is coupled to a corrugated box 158. Optionally, the insulating batt 22 can be directly coupled to the box or to an intermediary paper layer 160 prior to the box being cut into its form for a folded box 142. When used to form the pad 46, the binder material, in the form of recycling-compatible or water soluble adhesive or meltable fibers, can be preferably recyclable or biodegradable and can be preferably selected from the group containing polyethylene, polyester, polypropylene, and mixtures thereof.

The insulation batt 22 can be used in containers having a polymer bladder for holding liquids or storing gases, or packaging for photosensitive or like materials. In the regard, the insulation batt 22 can be used to hold the temperature of the materials described above or below ambient.

Optionally, the box 158 can be, for example, a flat box with thermal insulation on the top and bottom surfaces (for example a pizza box). It is envisioned the containers can be used to regulate the change of temperature within the box. For example, the container can contain a device such as a recyclable cold pack which will provide a specific environment for contents, e.g. temperature above or below ambient with thermal insulation. In this regard the cold pack can be a recyclable member which is perforated and holds, for example, dry ice. The containers can be formed by folding or erecting paper blanks. Incorporated into the containers can be removable or non-permanently secured closure members. The containers can include the insulation layer that includes shock-absorbing properties.

The containers, packaging elements, or packages using the insulation according to the present teachings can be adapted to protect organisms, articles, or materials presenting particular transport environment challenges. In this regard, the insulated box can be used to transport live plants or animals. The container can include an integral coupling or dispensing feature to allow the filling or dispensing of carried materials into the insulated container.

The paper, insulation construction is specially adapted to protect contents from mechanical damage. In this regard, the container can have a polygonal cross-section provided with internal protecting layers for contents. Containers or packages can have a special mechanism such as a foldable member or a funnel for dispensing contents, including formed pouring spouts, or dispensing means incorporated in removable or non-permanently secured container closures.

According to the present teachings, a method of forming an insulated box is presented. The method includes, forming paper fibers by passing recycled cardboard through a hammer mill, and mixing paper fibers with a recyclable compatible binder fibers to form mixtures of between 2% and 25% recycling compatible fibers and the balance paper and cardboard fibers. This material is then formed into a paper fiber batt from the recycled paper fibers and having a first width and first length having a weight between 1000 and 1600 gsm. Optionally, a recyclable first paper layer is coupled to the paper fiber batt on a first side of the batt. The fiber batt can be placed within or coupled to a corrugated box. The paper layer can be coupled to the corrugated paper element, or the batt can be directly coupled to a surface layer of the cardboard. Optionally, a recyclable second paper layer can be coupled to the paper fiber batt on a second side of the batt.

The batt can be formed by melting the binder fibers described above. The first paper layer can be coupled to the paper fiber batt by heating the paper layer or disposing one of a recycling-compatible or water soluble adhesive between the first paper layer and the batt. The first and second layers of recyclable paper can be disposed about the insulation to form a pocket. The first and second layers can be coupled to opposed sides of fiber paper layer by sewing or adhering with one of recycling-compatible or water soluble adhesive the pair of opposed sides. The binder fibers are selected from the group consisting of PVOH, polyethylene, polyester, polypropylene, bi-component and mixtures thereof. The insulative pad is about ¼ to about 1 inch thick.

An insulative mailer can be formed by cutting a first paper sheet, and coupling a first side of a paper fiber pad having a fibrous web of paper fibers distributed substantially randomly to the first paper sheet. The fibrous web of paper fibers can be interlocked to the first paper sheet. The insulative pad is coupled to a portion of an interior surface of a corrugated cardboard box. After coupling the fibrous web to the interior surface of the box, the process includes stamping an exterior perimeter of the box and folding the corrugated box. The fibers can be interlocked to the paper and cardboard fiber using heat, be it radiant through rollers or steam, to have a density of less than about 10 pounds per cubic foot.

To recycle the insulated containers according to the present teachings, clean, used insulated corrugated containers are collected, in many instances as part of a mixed recyclables stream such as single-stream recycling. To optimize recyclability, containers should be free of contaminants such as food, metal foil, wax, etc. The collected insulated corrugated containers are sorted, compacted, and baled with non-insulated corrugated containers for space-efficient storage and handling, either at the point of end-use (store or business) or at the recycling center. Bales are broken open, and the insulated corrugated containers are put into a repulper. The repulper is a huge tub having an agitatable member which agitates the containers with heated water. The water can preferably have a temperature above about 100 degrees F. They are agitated to form a slushy pulp (slurry) of fiber and water.

The repulper can have a chain or rope which hangs down into the swirling tub of material used to remove larger contaminates such as twine and long pieces of rope, string or tape, plastic and metal bands that will wrap around the chain and can then be pulled out of the repulper. The remaining pulp slurry goes through different filters where additional metal falls to the bottom for removal, screens, cyclones, and even big tanks where the contaminants float to the top and can be scraped off. The cleaned pulp is then sent to the paper machine.

In the typical paper machine the highly diluted fiber solution is poured out on to a moving screen which allows water to drain away, forming a continuous fiber mat. The continuous fiber matt is pressed between rollers to remove more water. The wet, continuous fiber web is then passed through the dryer where the top and bottom of the web alternately contact the heated surfaces of the drying cylinders, removing the remaining moisture from the paper. At the end of the paper machine, paper is rolled up on a large reel spool.

Corrugated board is formed from this material using three or more pieces of paper containerboard. The outer surfaces are linerboard and the inner, fluted paper is called medium. A sheet of paper which will become the corrugated medium can be softened with steam, and then fed through a machine called a single facer. The medium passes between two huge metal rolls with teeth which give it wavy ridges or "flutes". Starch adhesive is applied to the fluted medium, which is then sandwiched between two flat sheets of paper (linerboard). The insulated material, as described above, can be coupled to the cardboard to form a recycled insulated construction. In this regard, the insulating material can be directly coupled to the box, or recyclable paper disposed about the insulation.

The combined, 3± layer board with associated insulation is then passed through curing sections in a continuous web, and then is scored, cut into proper size blanks (sheets), and stacked. To manufacture a new box, the corrugated sheets are passed through machines that print, score, die cut, and fold them. The side seam of the box (manufacturer's joint) is fastened by gluing, taping, or stitching.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A repulpable insulation material comprising:
a batt formed of a mixture of cellulose fiber and between about 0.5% and about 25% thermoplastic binder fiber distributed substantially randomly within the cellulose fiber, said thermoplastic binder fiber being adhered to the cellulose fiber, wherein the thermoplastic binder fiber has a length of between about 0.5 mm to about 16 mm, and wherein subjecting the repulpable insulation material to a repulpability test produces greater than 85% fiber yield.

2. The repulpable insulation material according to claim 1 wherein the thermoplastic binder fiber is a meltable PE/PP bi-component thermoplastic binder fiber distributed substantially randomly.

3. The repulpable insulation material according to claim 2 wherein the thermoplastic binder fiber has about a 65/35 percent PE/PP mixture.

4. The repulpable insulation material according to claim 1 having a compression resistance of between about 0.3 psi and about 1.4 psi at thickness compressions of between about 25% and about 50%.

5. The repulpable insulation material according to claim 1 having a compression set at about 25% of between about 5% and about 18%.

6. The repulpable insulation material according to claim 1 wherein the batt is formed of a mixture of the cellulose fiber and about 10% by weight of said thermoplastic binder fiber.

7. The repulpable insulation material according to claim 1 wherein the cellulose fiber includes at least one of paper fiber and cardboard fiber.

8. The repulpable insulation material according to claim 1 wherein the cellulose fiber includes both paper fiber and cardboard fiber.

9. The repulpable insulation material according to claim 1 wherein the repulpable insulation material has a weight of between 1000 and 1600 GSM.

10. A method for producing an insulation material comprising:
   mixing cellulose reinforcement fibers with about 0.5% to about 25% by weight of a meltable PE/PP bi-component thermoplastic binder fiber having a length less than about 16 mm to distribute the PE/PP bi-component thermoplastic binder fiber substantially randomly within the cellulose reinforcement fibers to form a mixture; and
   applying heat to the mixture to melt the PE/PP bi-component thermoplastic binder fiber to bind the PE/PP bi-component thermoplastic binder fiber to the cellulose reinforcement fibers to from a batt, wherein subjecting the insulation material to a repulpability test produces a fiber yield of greater than 85%.

11. The method for producing an insulation material according to claim 10 further comprising coupling a first repulpable paper layer to the batt to form an insulative batt assembly.

12. The method for producing an insulation material according to claim 11 further comprising disposing a water soluble adhesive layer between the batt and the first repulpable paper layer.

13. The method for producing an insulation material according to claim 10 wherein the batt has a compression resistance of between about 0.3 psi and about 1.4 psi at compressions of between about 25% and about 50%.

14. The method for producing an insulation material according to claim 10 wherein the batt has a compression set at about 25% thickness compression of between about 5% and about 18%.

15. A repulpable insulation liner for a shipping container, the repulpable insulation liner comprising:
   a first paper layer; and
   a cellulose fiber pad coupled to the first paper layer, the cellulose fiber pad having cellulose reinforcement fibers interlocked with about 2% to about 25% by weight meltable PE/PP bi-component thermoplastic binder fiber distributed substantially randomly, wherein subjecting the repulpable insulation liner to a repulpability test produces greater than 85% fiber yield.

16. The repulpable insulation liner according to claim 15 wherein the meltable PE/PP bi-component thermoplastic binder fiber is a chopped fiber having a length less than about 24 mm.

17. The repulpable insulation liner according to claim 15 wherein the meltable PE/PP bi-component thermoplastic binder fiber has a length less between 0.5 to about 16 mm.

18. The repulpable insulation liner according to claim 15 further comprising one of a recycling-compatible or water soluble adhesive layer disposed between the first paper layer and the cellulose fiber pad.

19. The repulpable insulation liner according to claim 15 wherein the insulation liner has a weight of between 1000 and 1600 GSM.

20. The repulpable insulation liner according to claim 15 wherein the meltable PE/PP bi-component thermoplastic binder fiber has a plurality of different lengths.

21. The repulpable insulation liner according to claim 20 wherein the meltable PE/PP bi-component thermoplastic binder fiber has a length distribution of about 50% 1 mm length bi-component fiber and about 50% 6 mm length bi-component fiber.

22. The repulpable insulation liner according to claim 15 further comprising a second paper layer coupled to at least one of the cellulose fiber pad and the first paper layer.

23. The repulpable insulation liner according to claim 22 wherein:
   the second paper layer is coupled to the first paper layer; and
   the cellulose fiber pad is encapsulated between the first and second paper layers.

24. The repulpable insulation liner according to claim 1 wherein the cellulose reinforcement fibers include at least one of paper fibers and cardboard fibers.

25. The repulpable insulation liner according to claim 15 wherein the cellulose reinforcement fibers include both paper fibers and cardboard fibers.

26. The repulpable insulation liner according to claim 15 wherein the meltable PE/PP bi-component thermoplastic binder fiber makes up about 5% to about 10% by weight of the cellulose fiber pad.

27. The repulpable insulation liner according to claim 15 wherein the meltable PE/PP bi-component thermoplastic binder fiber makes up about 10% by weight of the cellulose fiber pad.

28. An insulation liner for a shipping container, the insulation liner comprising:
   a first paper layer;
   a second paper layer coupled to the first paper layer to form an envelope; and
   a cellulose fiber batt encapsulated between the first and second paper layers with edges of the first and second paper layers being joined together on all four sides of the cellulose fiber batt, the cellulose fiber batt including cellulose fibers bound together by thermoplastic binder fibers, wherein subjecting the cellulose fiber batt to a repulpability test produces greater than 85% fiber yield.

29. The insulation liner according to claim 28 wherein the thermoplastic binder fibers makeup between about 5% and about 10% by weight of the cellulose fiber batt.

30. The insulation liner according to claim 29 wherein the thermoplastic binder fibers makeup about 10% by weight of the cellulose fiber batt.

31. The insulation liner according to claim 29 wherein the thermoplastic binder fibers are meltable PE/PP bi-component thermoplastic binder fibers.

32. The insulation liner according to claim 28 wherein the cellulose fibers include at least one of paper fibers and cardboard fibers.

33. The insulation liner according to claim 28 wherein the cellulose fibers include both paper fibers and cardboard fibers.

34. The insulation liner according to claim 28 wherein the cellulose fiber batt has a weight of between 1000 and 1600 GSM.

* * * * *